US011228962B2

(12) United States Patent
Templin

(10) Patent No.: US 11,228,962 B2
(45) Date of Patent: Jan. 18, 2022

(54) ASYMMETRIC NEIGHBOR CACHE ENTRIES FOR ROUTE ENHANCEMENT IN MULTILINK COMMUNICATIONS

(71) Applicant: THE BOEING COMPANY, Chicago, IL (US)

(72) Inventor: Fred L. Templin, North Bend, WA (US)

(73) Assignee: THE BOEING COMPANY, Chicago, IL (US)

( * ) Notice: Subject to any disclaimer, the term of this patent is extended or adjusted under 35 U.S.C. 154(b) by 198 days.

(21) Appl. No.: 16/566,051

(22) Filed: Sep. 10, 2019

(65) Prior Publication Data

US 2021/0076295 A1  Mar. 11, 2021

(51) Int. Cl.
*H04W 40/24* (2009.01)
*H04W 84/18* (2009.01)
*H04W 76/14* (2018.01)
*H04W 40/20* (2009.01)
*H04W 76/40* (2018.01)

(52) U.S. Cl.
CPC ......... *H04W 40/246* (2013.01); *H04W 40/20* (2013.01); *H04W 76/14* (2018.02); *H04W 76/40* (2018.02); *H04W 84/18* (2013.01)

(58) Field of Classification Search
CPC ... H04W 40/20; H04W 40/246; H04W 84/18; H04W 76/14; H04W 76/40
USPC .......................................................... 370/236
See application file for complete search history.

(56) References Cited

U.S. PATENT DOCUMENTS

| 6,421,321 | B1 * | 7/2002 | Sakagawa | ........... | H04L 12/4608 370/238.1 |
| 2009/0073935 | A1 * | 3/2009 | Xia | ........... | H04W 8/26 370/331 |
| 2016/0344693 | A1 * | 11/2016 | Wetterwald | ........... | H04L 61/103 |
| 2019/0260609 | A1 * | 8/2019 | Zhang | ........... | H04L 1/1642 |

* cited by examiner

*Primary Examiner* — Gbemileke J Onamuti
(74) *Attorney, Agent, or Firm* — Patterson + Sheridan, LLP

(57) ABSTRACT

Certain aspects of the present disclosure provide a method that comprises receiving, from a first node, a neighbor solicitation (NS) message via a virtual link, wherein the NS message is configured to provide an indication of a request to communicate with a second node, and request one or more communication parameters corresponding to the second node. The method can also include storing the indication of the request in a report list, and transmitting, via the virtual link, a neighbor advertisement (NA) message to the first node in response to the NS message, wherein the NA message comprises the one or more communication parameters corresponding to the second node.

20 Claims, 6 Drawing Sheets

ASYMMETRIC NEIGHBOR CACHE ENTRIES FOR ROUTE ENHANCEMENT IN MULTILINK COMMUNICATIONS

INTRODUCTION

Aspects of the present disclosure relate to coordination of communications between neighboring nodes, and in particular to systems and methods for coordinating route optimized communication relationships between nodes having multiple link-layer address per network interface.

Coordinating route enhancement communications between neighboring nodes can be limiting in the sense that a network interface is generally constrained to a single link-layer address. This restricts the availability of other link-layers to a node that can provide a superior (e.g., higher reliability, lower latency, and/or higher quality) communication link.

BRIEF SUMMARY

In a first embodiment, a method comprises receiving, by an address resolution and routing agent (ARRA) that comprises a processor, a neighbor solicitation (NS) message via a virtual link. In some examples, the NS message is received from a first node and is configured to provide an indication of a request to communicate with a second node, and request one or more communication parameters corresponding to the second node. The method may also comprise storing the indication of the request in a report list of the ARRA, and transmitting, via the virtual link, a neighbor advertisement (NA) message to the first node in response to the NS message, wherein the NA message comprises the one or more communication parameters corresponding to the second node.

In another embodiment, a method comprises, in response to determining that a signal is to be transmitted from a first node to a second node, transmitting, by the first node comprising a processor, a first neighbor solicitation (NS) message to an address resolution and routing agent (ARRA), wherein the NS message is configured to indicate the determination to communicate with the second node. In some examples, the method comprises receiving, from the ARRA, a neighbor advertisement (NA) message in response to the NS message, wherein the NA message comprises one or more communication parameters corresponding to the second node. In some examples, the method comprises transmitting the signal to the second node using at least one of the one or more communication parameters.

In another embodiment, an apparatus comprises a processor and a memory that stores executable instructions that, when executed by the processor, facilitate performance of operations. In some examples, the operations comprise receiving, from a first node, a neighbor solicitation (NS) message via a virtual link. In some examples, the NS message is configured to provide an indication of a request to communicate with a second node, and request one or more communication parameters corresponding to the second node. In some examples, the operations comprise storing the indication of the request in a report list, and transmitting, via the virtual link, a neighbor advertisement (NA) message to the first node in response to the NS message, wherein the NA message comprises the one or more communication parameters corresponding to the second node.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment can be beneficially incorporated in other embodiments without further recitation.

DETAILED DESCRIPTION

Figure 1:
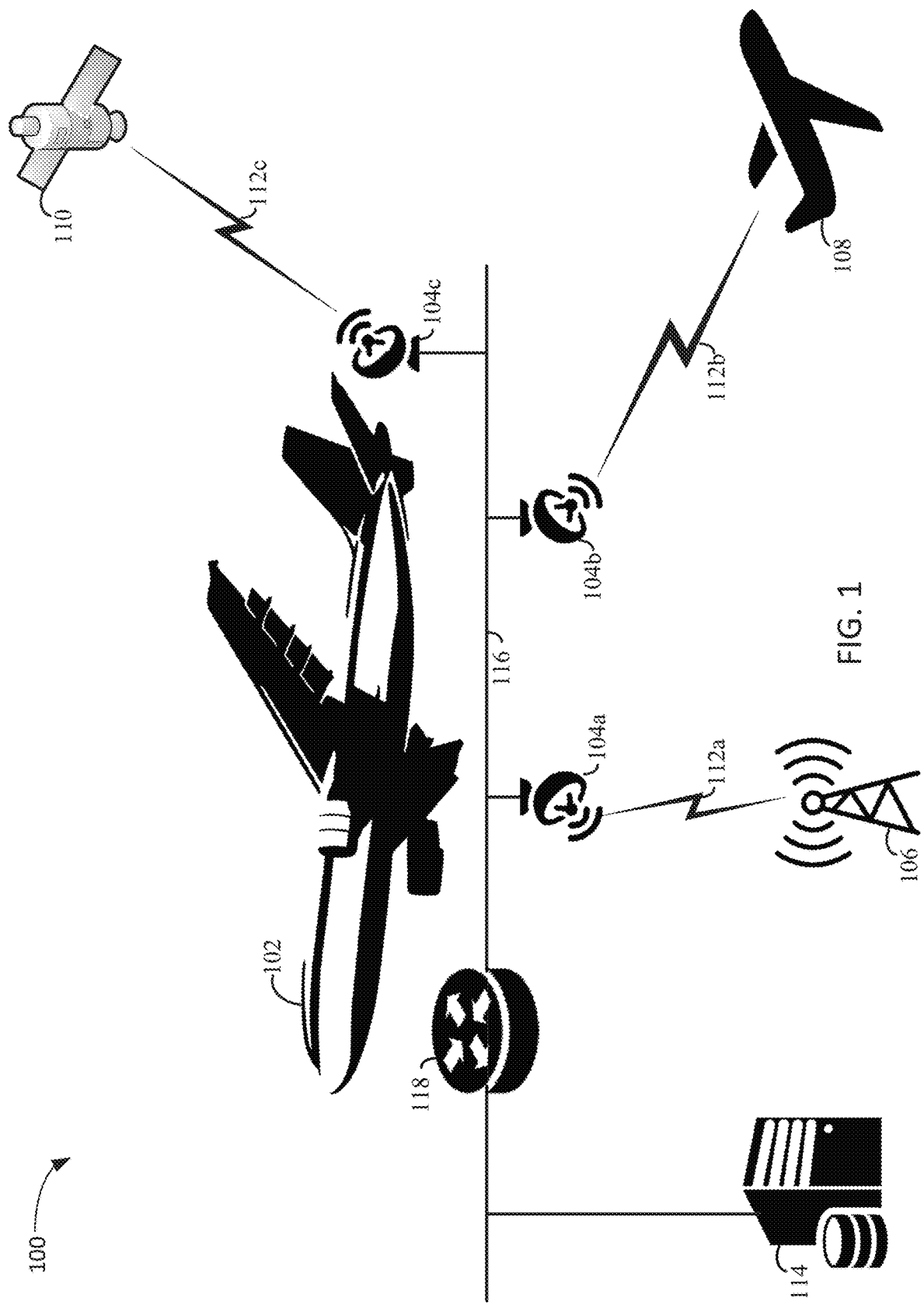
FIG. 1 is a diagram conceptually illustrating an example air vehicle communication system, in accordance with certain aspects of the present disclosure.

Aspects of the present disclosure provide systems and methods for coordinating asymmetric communication relationships between nodes having multiple link-layer addresses per network interface. The described embodiments can utilize neighbor cache entries, where an entry is only maintained in the forward direction and packet communication is unidirectional (e.g., packet communication from a source node to a target node). The following disclosure describes methods and components that enable a computer system to operate as a special purpose computer system for improving communication between nodes. In some examples, the computer system improves communication through management of multilink relationships between nodes having more than one link-layer address per single network interface. For example, aspects of the disclosure relate to providing and dynamically updating multiple link-layer addresses between the nodes such that the network interface is not constrained to a single link-layer address. This improves the communication ability of a node by providing multiple alternative link-layer addresses that can be reliably used for communication with neighboring nodes.

According to certain aspects, an address resolution and routing agent (ARRA) can utilize a neighbor cache entry to provide a source node with network-layer and/or link-layer addresses of a target node. The addresses can enable the source node to transmit unidirectional packet communications to the target node. In some configurations, the source node can initiate such unidirectional packet communications by transmitting a neighbor solicitation (NS) message to the ARRA. In some examples, the NS message is configured to request one or more communication parameters (e.g., one or more of a network-layer address and/or a link-layer address) of the target node from the ARRA, and to notify the ARRA that the source node has determined to communicate with the target node.

In certain aspects, the ARRA receives the NS message from the source node, and stores a temporary indicator in a report list based on the NS message. For example, the ARRA can store an indication that the source node requested to communicate with the target node, wherein the stored indicator is configured to expire after a period of time. In response to receiving the NS message, the ARRA can transmit a neighbor advertisement (NA) message to the source node. In some configurations, the ARRA generates the NA message by retrieving communication parameters corresponding to the target node stored in a neighbor cache. For example, the NA message can be generated to comprise one or more of a network-layer address and/or a link-layer address corresponding to the target node and stored in the neighbor cache of the ARRA. In some examples, the link-layer address is an address to a unidirectional communication link.

According to certain aspects, the source node receives the NA message and stores the communication parameters in a neighbor cache of the source node. The source node can then use the communication parameters to communicate with the target node. It should be noted however, that because the source node received one or more communication parameters corresponding to the target node from the ARRA, and because the target node did not receive similar information regarding the source node, communication between the source node and the target node is asymmetric.

The various concepts presented throughout this disclosure can be implemented across a broad variety of communication systems, network architectures, and communication standards. Specific embodiments can be implemented in any suitable node network, whether wired or wireless.

Referring now to FIG. 1, as an illustrative example without limitation, a high-level diagram illustration of an air vehicle (AV) communication system 100 is provided.

In the AV communication system 100, multiple communications occur between a number of communicating nodes, shown in FIG. 1 as an AV 102, one or more fixed and/or mobile ground stations 106, one or more satellites 110, and one or more manned and/or unmanned AVs 108. As used herein, an AV (e.g., 102, 108) can comprise manned and/or unmanned airplanes, rotorcrafts, airships (including blimps), gliders, missiles, and any other suitable object that propels itself through air. While lines of communication (e.g., virtual link 116 and wireless data link 112a-112c) are shown in FIG. 1 as being transmitted to and from the communicating nodes, one of skill in the art will appreciate that communications can occur between any two or more of the communicating nodes. For example, one or more of the communicating nodes can act as a relay node. In one example, a relay node (e.g., satellite 110) receives a transmission of data and/or other information from an upstream node (e.g., AV 102) and sends a transmission of the data and/or other information to a downstream node (e.g., ground station 106). Though certain embodiments are described with respect to communications between AVs, it should be noted that similar techniques can be used for communication between other types of stationary and mobile vehicles. For example, fixed/mobile ground stations, fixed/mobile terminals, satellites, access points, transmission and reception points, autonomous underwater vehicles, connected cars, etc. Moreover, similar techniques can be used for communication between even personal communication devices such as handheld devices, smart phones, mobile radios, satellite communication (SATCOM) receivers, and other suitable communication devices.

In some embodiments, AV 102 is configured for network-layer communications between various nodes, including satellite, sea, air, and ground nodes using an internet protocol, such as transmission control protocol internet protocol (TCP/IP), user datagram protocol (UDP), internet protocol version 4 (IPv4), IPv6, and/or other suitable protocols.

AV 102 is also configured for physical link-layer communications between the various nodes using physical link-layer interfaces. In some examples, physical link-layer interfaces comprise communication systems 104a-104c configured to communicate utilizing satellite communication (SATCOM) systems, wide band satellite (WB SATCOM) systems, narrow bandwidth satellite (NB SATCOM) systems, common data link (CDL) systems, very-high frequency (VHF) and ultra-high frequency (UHF) line of sight (LOS) systems, and/or cellular systems utilizing long-term evolution (LTE) and/or 4G/5G cellular network technology.

The communication systems 104a-104c comprise an air-to-ground (A2G) interface 104a, an air-to-air (A2A) interface 104b, and a satellite interface 104c, all configured to communicate with another node using a wireless data link 112a-112c.

It should be noted that these links or bandwidths are not intended to be limitative of the AV communication system 100. For example, the communication techniques described herein can be implemented over various other platforms (e.g., mobile user equipment communications, vehicle-to-everything (V2X) communications, computer networking, etc.) that communicate using various protocols wherein a protocol refers to, for example, a particular frequency, power strength, voltage level of a signal, and/or an arrangement of bits or voltages of a signal in the case of a digital signal.

In some configurations, network-layer communications and physical link-layer communications are managed by a virtual interface 118 configured to control data and/or voice communications over the virtual link 116 and one or more communication systems 104a-104c of the AV 102. In some examples, the virtual interface 118 is implemented by various software drivers, including a virtual network interface card (vNIC) and/or virtual host bus adapter (vHBA) running on a hardware platform (e.g., physical computing device, such as a server, workstation, etc., or a virtual computing instance, such as a virtual machine, container, etc.) that comprises one or more processors, memory and digital storage devices on the AV 102.

The virtual interface 118 manages network-layer communications and physical link-layer communications by assigning an address to each link for communication via the virtual link 116. For example, the virtual interface 118 can be configured for traffic engineering and distributing data communications over the virtual link 116. Throughout the disclosure, virtual interface 118 can also be referred to as a "multi-layer interface" due to its ability to interface with both link-layer (e.g., physical layer) and network-layer (e.g., data routing) communication systems. In an example, virtual link 116 can be a non-broadcast multiple access (NBMA) link.

In FIG. 1, the virtual link 116 is shown providing a single link between multiple physical link-layer communication systems 104a-104c and an ARRA 114 communicatively coupled to AV 102 via the virtual link 116. In some examples, the ARRA is a network entity configured to operate via a server. In this context, the virtual link 116 is understood to be a data communication path enabled by a network-layer protocol within an Internet service provider (ISP) network.

Example Multi-Link Communication Implementations

Figure 2A:
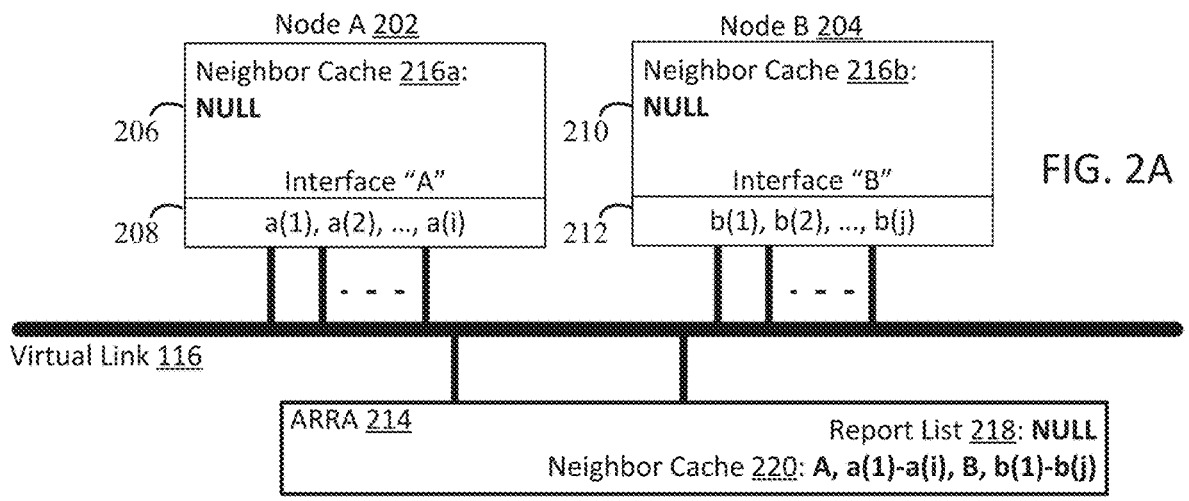
FIGS. 2A-2C are block diagrams conceptually illustrating an example for implementing a report list and neighbor cache communication between an address resolution and routing agent (ARRA) and two nodes, in accordance with certain aspects of the present disclosure.
Figure 2B:
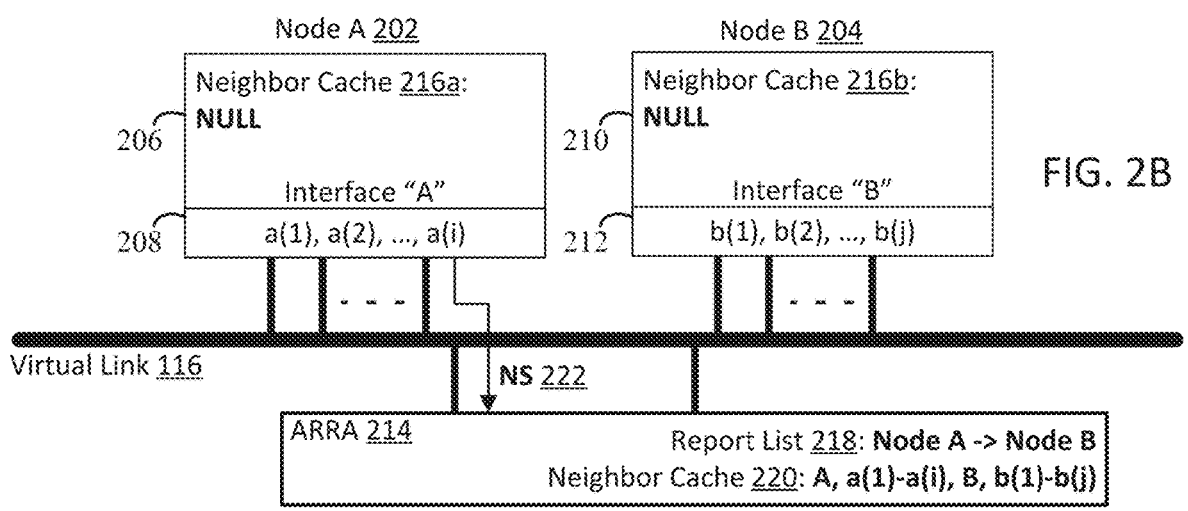
Figure 2C:
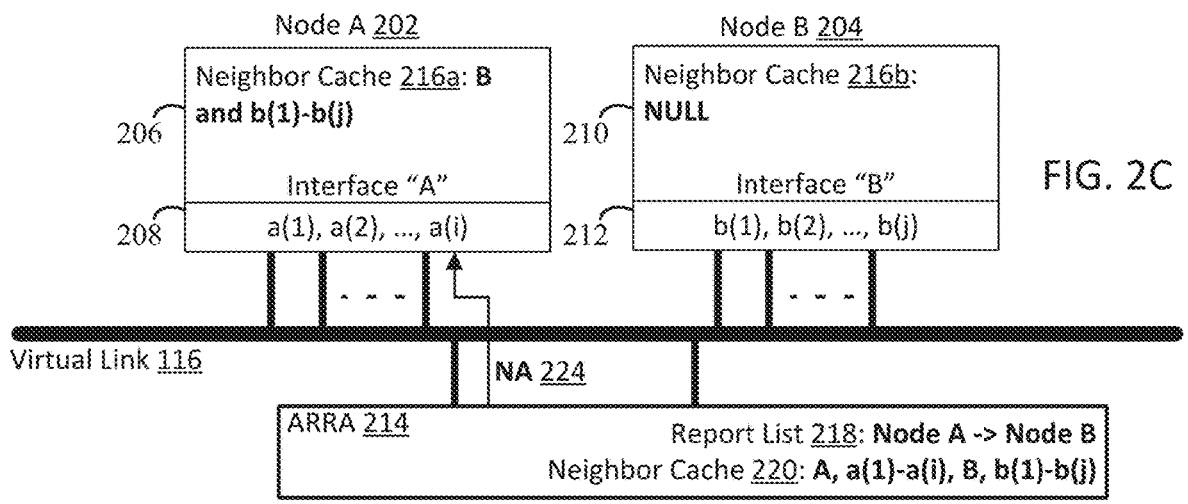

FIGS. 2A-2C are block diagrams conceptually illustrating an example for implementing an asymmetric, multi-link communication between two nodes, in accordance with certain aspects of the present disclosure. More specifically, FIGS. 2A-2C illustrate an example sequence of events configured to establish unidirectional communication from node A 202 (e.g., a source node) to node B 204 (e.g., a target node) over a physical link. In some examples, one or both of node A 202 and node B 204 of FIGS. 2A-2C can correspond to the AV 102, a fixed/mobile ground station 106, a satellite 110, and/or a manned/unmanned AV 108, depicted in FIG. 1.

For example, FIG. 2A illustrates an initial state between node A 202 and node B 204 that share a virtual link 116. Each of node A 202 and node B 204 comprise a virtual interface 206, 210 and a set of virtual link addresses 208, 212 for a network-layer and a physical link-layer that communicates over the virtual link 116. For example, virtual interface (interface "A") 206 for node A 202 manages the network-layer and the physical link-layer communications that are received and transmitted by the router 114 and/or one or more communication systems 104a-104c of node A 202.

In some configurations, the virtual interface 206 for node A 202 performs traffic engineering communications for virtual link addresses a(1)-a(i) 208 (wherein, i can be most any integer greater than 1). In one example, the virtual link addresses (208, 212) can correspond to one or more links provided by the physical link-layer. In some examples, the virtual link addresses a(1)-a(i) 208 are associated with unidirectional communications. For example, node A 202 can be able to receive data transmitted by node B 204 using a link associated with virtual link address a(1), but node A 202 cannot respond or transmit data to node B 204 using the same link associated with address a(1). As used herein, the term "traffic engineering" relates to management of communications over both a network-layer and a physical link-layer by a virtual interface, such as virtual interfaces 206 and 210. Such management can comprise bandwidth and quality of service (QoS) management, as well as data routing and/or addressing.

For example, a first node can transmit data to a second node using a virtual link address (e.g., a(1)) that corresponds to a QoS profile associated with the data being transmitted. That is, the QoS profile of the data being transmitted provides the virtual interface (206, 210) with a basis for traffic engineering. For example, a first QoS profile associated with voice data could direct node B 204 to transmit the voice data to node A 204 over a cellular link. Similarly, a second QoS profile associated with video data could direct node B 204 to transmit video data over, for example, a satellite link. Likewise, a third QoS profile associated with text data could direct node B 204 to transmit text data over a VHF link. In another example, the QoS profile could direct multiple copies of the same data to be transmitted over multiple physical link-layers simultaneously to support data reliability. Thus, as explained in more detail below, by creating asymmetric (unidirectional) neighbor cache entries at node A 202 and node B 204, each node can communicate data to the other node over one or more available physical link-layer paths, or over one or more suitable physical link-layer paths according to the QoS profile of the data being transmitted.

Being a "cache", the neighbor cache entries are simply neighbor states that are relevant at a particular point in time, stored and maintained in data structures. In some examples, the neighbor cache entries comprise multiple link-layer addresses, each corresponding to one of multiple data link connections. The described embodiment can also utilize report list entries maintained at the target node for the purpose of informing (asymmetric) source nodes if any entries of the neighbor cache change.

The virtual interface (interface "B") 210 for node B 204 can operate similarly to the virtual interface 206 of node A. For example, the virtual interface 210 of node B can be configured to manage the network-layer and the physical link-layer communications that are received and transmitted via virtual link addresses b(1)-b(j) 212 (wherein, j can be most any integer greater than 1).

The initial state shown in FIG. 2A shows the virtual interfaces 206, 210 of each of node A 202 and node B 204 having neighbor cache 216a, 216b. The neighbor cache 216a, 216b is configured to store communication parameters (e.g., one or more of a network-layer address and/or a link-layer address of a neighboring node) received in a neighbor advertisement (NA) message from an address resolution and routing agent (ARRA) 214. In some configurations, the NA message 224 comprises an address for a network-layer interface of a neighboring node, as well as physical link-layer addresses associated with a link-layer interface (e.g., communication systems 104a-104c) of the neighboring node. In some configurations, the link-layer addresses can be associated with forward direction (e.g., downlink) physical links that do not support bi-directional communication. In some examples, a forward direction link can have a corresponding reverse direction (e.g., uplink) physical link having a separate address. It should be noted that a "neighboring node" can relate to any node that is a neighbor to another node. For example, any node that can communicate with node A 202 or node B 204 on the virtual link 116 can be a neighbor node.

In this example, neighbor cache 216a, 2016b starts off as "null" for each of node A 202 and node B 204.

FIG. 2B is block diagram illustrating a scenario where node A 202 is likely to engage in communicating data to node B 204. In this example, node A 202 determines to communicate with node B 204, but does not have an address for node B 204. Accordingly, node A 202 sends an NS message 222 to the ARRA 214 over the virtual link 116. The ARRA 214 comprises a neighbor cache 220 that comprises network-layer addresses and physical link-layer addresses for each node on the virtual link 116, and can therefore facilitate communication between the nodes. The ARRA 214 also comprises a report list 218 configured to store information corresponding to any NS message 222 received by the ARRA 214.

In some configurations, the NS message 222 is configured to indicate that node A 202 determined to communicate with node B 204, or that node A 202 needs to communicate with node B 204. Thus, the ARRA 214 can store such information in the report list 218. As shown in FIG. 2B, the report list 218 comprises an entry "Node A->Node B," indicating that node A 202 has determined to communicate with node B 204. The report list 218 can grow to comprise information of any other node on the link 116 that determines to communicate with node B 204. For example, the report list 218 can grow to comprise node C and node D (not shown). In some examples, an entry in the report list 218 can have an expiration time, or a duration of time that it is active before being removed from the report list 218.

In response to receiving the report list 218, the ARRA 214 can generate an NA message 224 that comprises the address information for node B 204 contained in the neighbor cache 220.

FIG. 2C is block diagram illustrating a subsequent state to FIG. 2B. In response to receiving the NS message 222, the ARRA 214 generates and communicates an NA message 224 to node A 202. Upon receiving the NA message 224, node A 202 can store the address information for node B 204 in its neighbor cache 216a. In this example scenario, node A 202 now regards node B 204 as a multi-link neighbor. With no other changes, this scenario is steady state and node A 202 can send data to node B 204 unidirectionally over the virtual link 116 using physical link-layer address (e.g., one or more of b(1), b(2), . . . , b(j)) without passing the data through the ARRA 214.

Moreover, in this state, the ARRA 214 can notify node A 202 if there are any changes to one or more of the addresses corresponding to the physical link-layers of node B 204 so long as the report list 218 generated in response to the NS message 222 has not expired. For example, if node B is in motion, it can move in and out of range of different cellular communication towers (or cells), satellite coverages, etc. In this example, if node B 204 changes cell towers, the physical link-layer address can also change. In another example, interference can degrade signal strength of a particular link, which can prompt node B 204 to notify node A 202 to stop using the physical link-layer address (e.g., physical link-layer address b(2)) corresponding to the particular link).

In any of these examples, node B 204 notifies the ARRA 214 of the change. In response, the ARRA 214 updates its neighbor cache 220 and checks the report list to determine if it contains any active entries. Once the ARRA 214 determines it contains an active entry for node A 202, the ARRA 214 communicates another NA message to node A 202 comprising the address change. In some configurations, node A 202 indexes the physical link-layer addresses by the network-layer address of node B 204. Thus, as noted above, link reliability and communication quality is improved by dynamically updating the neighbor cache entry of a corresponding node (e.g., node B).

Figure 3A:
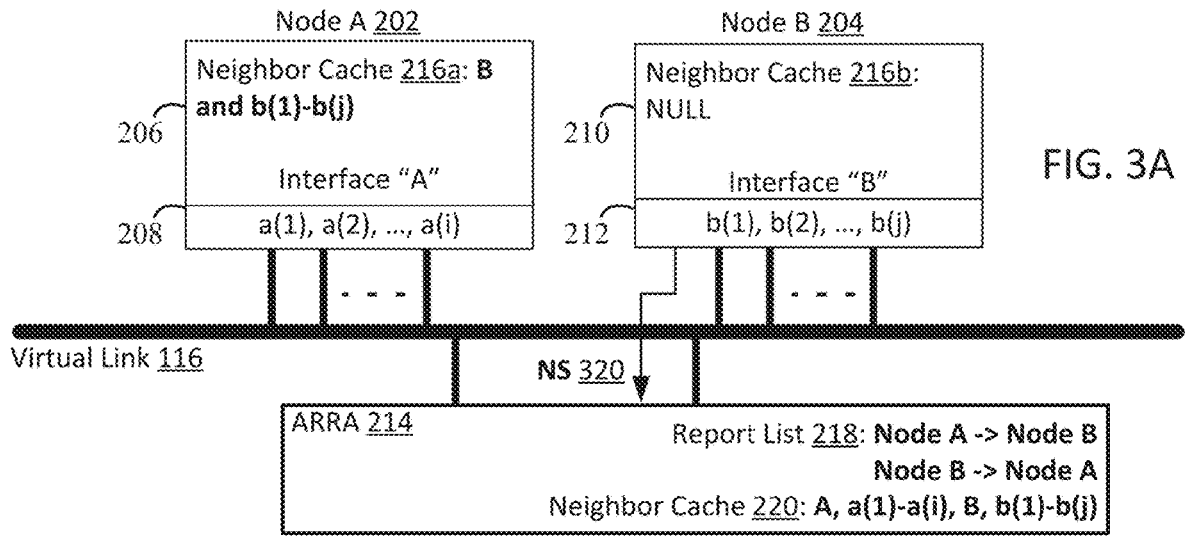
FIGS. 3A and 3B are block diagrams conceptually illustrating an example implementation for exchanging a report list and neighbor cache after the communication illustrated in FIGS. 2A-2C, in accordance with certain aspects of the present disclosure.
Figure 3B:
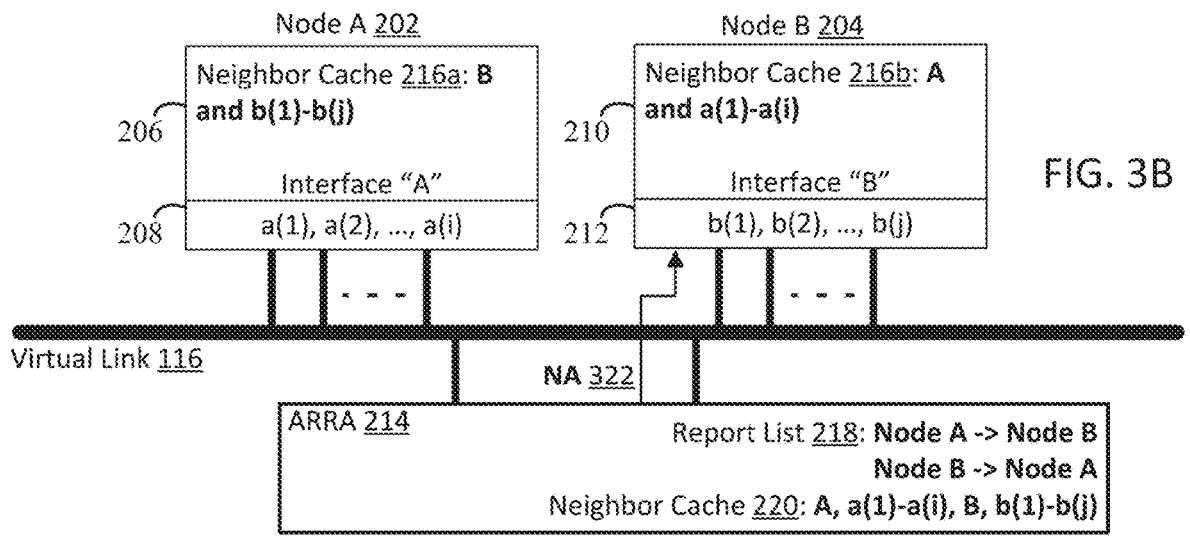

Although certain embodiments are described above in reference to FIGS. 2A-2C, such communications can be mirrored between the two nodes. For example, FIGS. 3A and 3B illustrate a sequence of events configured to establish an additional unidirectional communication between node A 202 and node B 204 over a physical link-layer, according to certain aspects described herein. More specifically, the sequence of events in FIGS. 3A and 3B corresponds to establishing unidirectional communication from node B 202 to node A 204 over a physical link, following the sequence of events illustrated in FIGS. 2A-2C. As such, techniques described in relation to FIGS. 3A and 3B can be similar to those described above with respect to FIGS. 2B and 2C.

FIG. 3A is block diagram illustrating a scenario where node B 202 is likely to engage in communicating data to node A 204, after node A 202 has received an NA message 224 comprising node B's 204 address information. In this example, node B 204 communicates an NS message 320 to the ARRA 214 over the virtual link 116. When the ARRA 214 receives the NS message 320, it stores an indication that node B 204 has determined to communicate with node A 202 in a report list 218, similar to the techniques described above with regard to node A 202.

FIG. 3B is block diagram illustrating a scenario where node B 204 is likely to engage in communicating data to node A 202 via a physical link-layer. In response to receiving the NS message 320, the ARRA 214 communicates an NA message 322 to node B 204. Node B 204 stores the NA message 322 contents (e.g., network-layer address and physical link-layer addresses of node A 202) in a neighbor cache 216b. In some configurations, node B 204 indexes the physical link-layer addresses by the network-layer address of node A 202.

In this example scenario, node B 204 now regards node A 202 as a multi-link (e.g., multiple unidirectional links) neighbor. With no other changes, both node A 202 and node B 204 can communicate with each other over the link 116 via one or more physical link-layer addresses without passing the data through a router at the network-layer. Moreover, in this state, both node A 202 and node B 204 can notify the other if there are any changes to one or more of the physical link-layer addresses of node A 202 or node B 204 that the other node is using for communication. Node A 202 and node B 204 can communicate the notification of a change to a physical link-layer address to the other node via a network-layer communication using the network-layer address of the other node stored in the report list 218.

Example Method for a Multi-Link Communication Implementation

Figure 4:
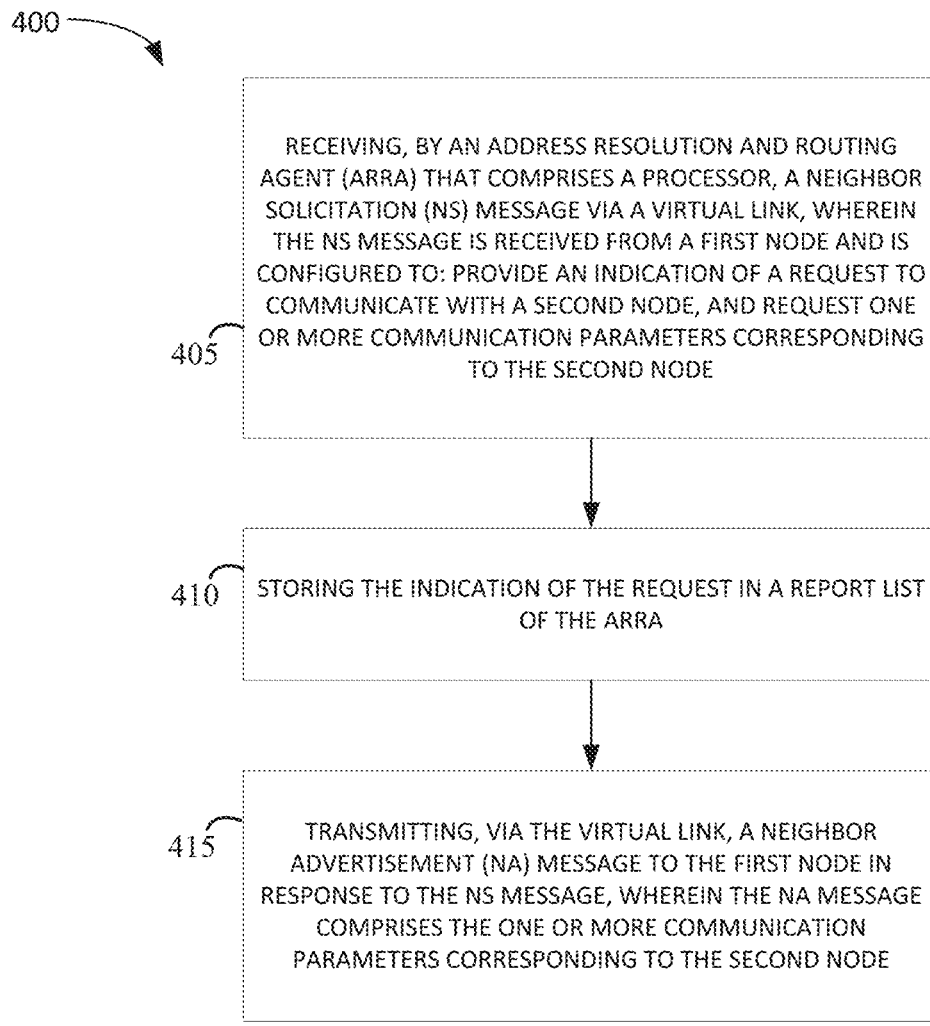
FIG. 4 is a flow chart illustrating a first example operation for exchanging a report list and neighbor cache, in accordance with certain aspects of the present disclosure.

FIG. 4 is a flowchart illustrating an example method 400 for communication by an address resolution and routing agent (ARRA).

Method 400 begins at step 405 with receiving, by an address resolution and routing agent (ARRA) that comprises a processor, a neighbor solicitation (NS) message via a virtual link, wherein the NS message is received from a first node and is configured to: provide an indication of a request to communicate with a second node, and request one or more communication parameters corresponding to the second node.

Method 400 then proceeds to step 410 by storing the indication of the request in a report list of the ARRA.

Method 400 then proceeds to step 415 by transmitting, via the virtual link, a neighbor advertisement (NA) message to the first node in response to the NS message, wherein the NA message comprises the one or more communication parameters corresponding to the second node.

Though not depicted in FIG. 4, method 400 can comprise additional and/or alternative steps in other examples.

For example, the stored indication of the request is configured to expire after a defined period of time.

In another example, the communication parameters corresponding to the second node comprise a network-layer address of the second node and a plurality of physical link-layer addresses of the second node.

In another example, the method 400 comprises receiving, from the second node, signaling configured to indicate a change in one or more of the network-layer address corresponding to the second node, or the plurality of physical link-layer addresses corresponding to the second node.

In another example, wherein the NA message is a first NA message and the method 400 further comprises: determining whether the report list comprises the stored indication of the request to communicate with the second node; and in response to determining that the report list comprises the stored indication, transmitting, via the virtual link, a second NA message to the first node, wherein the second NA message comprises the indication of the change.

In another example, virtual link corresponds to a NBMA link.

In another example, the ARRA comprises a neighbor cache comprising respective communication parameters for a plurality of nodes on the virtual link.

Figure 5:
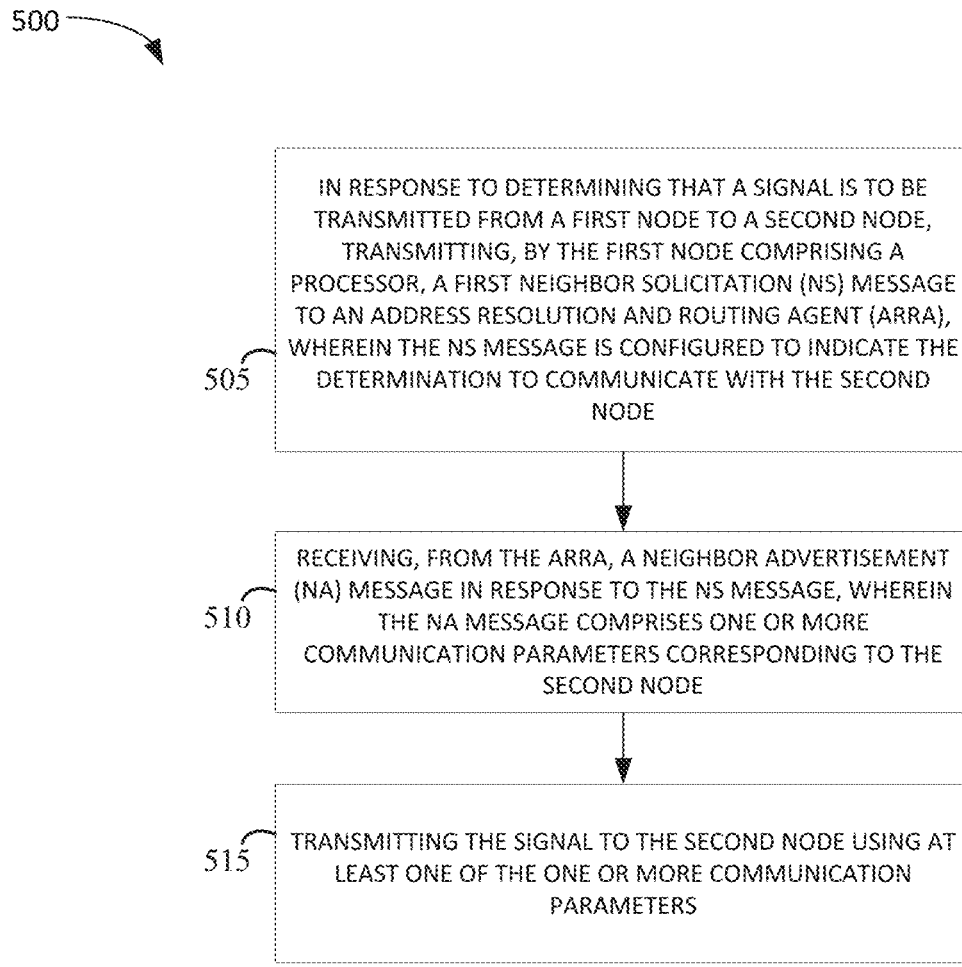
FIG. 5 is a flow chart illustrating a second example operation for exchanging a report list and neighbor cache, in accordance with certain aspects of the present disclosure.

FIG. 5 is a flowchart illustrating an example method 500 for communication by a first node.

Method 500 begins at step 505 with, in response to determining that a signal is to be transmitted from a first node to a second node, transmitting, by the first node comprising a processor, a first neighbor solicitation (NS) message to an address resolution and routing agent (ARRA), wherein the NS message is configured to indicate the determination to communicate with the second node.

The method 500 then proceeds to step 510 with receiving, from the ARRA, a neighbor advertisement (NA) message in response to the NS message, wherein the NA message comprises one or more communication parameters corresponding to the second node.

The method 500 then proceeds to step 515 with transmitting the signal to the second node using at least one of the one or more communication parameters.

Though not depicted in FIG. 5, method 500 comprises additional and/or alternative steps in other examples.

For example, transmitting the signal to the second node comprises transmitting the signal over a virtual link via a virtual link interface.

In another example, the communication parameters corresponding to the second node comprise a network-layer address of the second node and a plurality of physical link-layer addresses of the second node.

In another example, the plurality of physical link-layer addresses correspond to one or more of a plurality of wireless communication links or a plurality of wired communication links.

In another example, each of the plurality of physical link-layer addresses are configured to provide a unidirectional communication link for transmitting the signal to the second node.

In another example, the NA message is a first NA message and the method 500 further comprises receiving, from the ARRA, a second NA message configured to indicate a change in the one or more communication parameters corresponding to the second node.

In another example, the method 500 further comprises determining a failure of a first communication parameter of the one or more communication parameters, transmitting, to the ARRA, a second NS message to trigger a second NA message response, and receiving, from the ARRA, a second NA message, wherein the second NA message comprises an indication of a change in the one or more communication parameters corresponding to the second node.

Example Processing System

Figure 6:
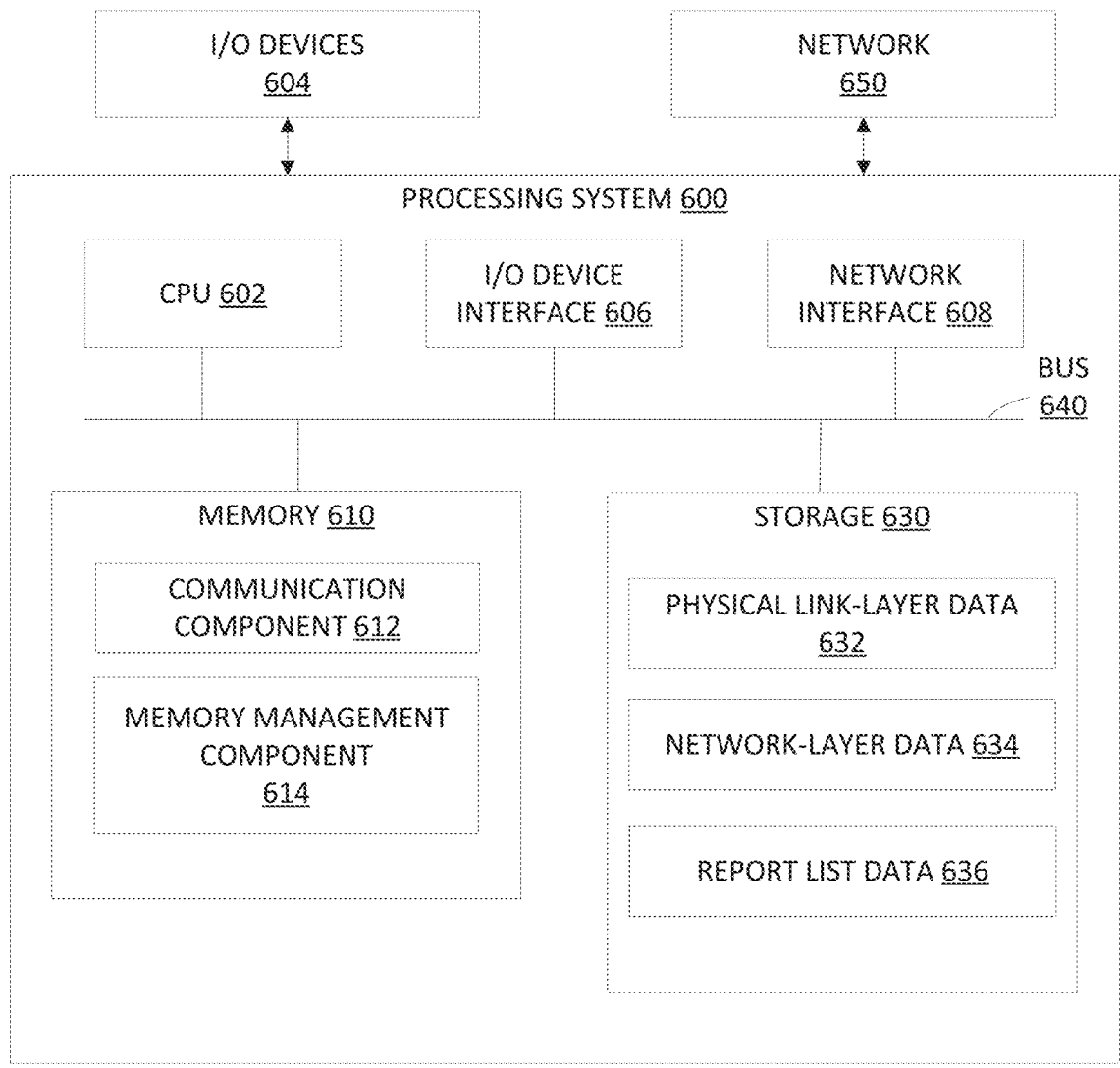
FIG. 6 is a block diagram illustrating an example processing system, in accordance with certain aspects of the present disclosure.

FIG. 6 is a block diagram illustrating an example processing system 600. For example, processing system 600 can be configured to perform the methods and operations described here.

Processing system 600 comprises a CPU 602 connected to a data bus 640. CPU 602 is configured to process computer-executable instructions, e.g., stored in memory 610 or storage 630, and to cause processing system 600 to perform methods as described herein, for example with respect to FIGS. 4 and 5.

CPU 602 is included to be representative of a single CPU, multiple CPUs, a single CPU having multiple processing cores, and other forms of processing architecture capable of executing computer-executable instructions.

Processing system 600 further comprises input/output device(s) 604 and input/output interface(s) 606, which allow processing system 600 to interface with input/output devices, such as, for example, keyboards, displays, mouse devices, pen input, and other devices that allow for interaction with processing system 600.

Processing system 600 further comprises network interface 608, which provides processing system 600 with access to external networks, such as network 650. In some implementations, network interface 608 can comprise one or more of a receiver, a transmitter, or a transceiver. Network 650 can be a local area network (LAN), a wide area network (WAN), the Internet, a cellular network, a satellite communication network, and the like.

Processing system 600 further comprises memory 610, which in this example comprises a plurality of components.

For example, memory 610 comprises a communication component 612, which is configured to perform various functions, including, for example, receiving a wireless communication, via an I/O device 604 (e.g., a transceiver) and/or the network 650. In one example, the communication component 612 performs receiving and/or transmitting a neighbor solicitation (NS) message.

The communication component 612 can also support transmitting and/or receiving, via the I/O device 604 and/or the network 650, a wireless communication. In one example, the communication component 612 is configured to transmit and/or receive, via a virtual link, a neighbor advertisement (NA) message in response to an NS message. In another example, the communication component 612 is configured to transmit a message to the second node via a virtual link associated with a virtual interface utilizing a network-layer address and/or a physical layer address. The communication component 612 can be configured to implement one or more of the functions described herein and in relation to FIGS. 4 and 5.

Memory 610 further comprises a memory management component 614, which is configured to perform various functions, including storing and retrieving functions as described above (e.g., with respect to FIGS. 4 and 5)). In one example, the memory management component 614 is configured to store in a memory 610 or storage 630, physical link-layer data 632 (e.g., a plurality of physical link-layer addresses stored in a neighbor cache 216 and/or report list 218), network-layer data 634 (e.g., one or more network-layer address corresponding to the physical link-layer addresses stored in a neighbor cache 216 and/or report list 218), and report list data 636 corresponding to an indication provided in an NS message (e.g., a determination by a node to communicate with a neighbor node). In another example, the memory management component 614 is configured to retrieve, from the memory 610 or the storage 630 the physical link-layer data 632 and/or the network-layer data 634.

Notably, the various aspects of processing system 600, including the components in memory 610 and the data in storage 630 are just one example, and many others are possible consistent with the methods and systems disclosed herein.

Example Embodiments

The following are example embodiments. Notably, the reference numerals in the examples below are merely examples. Further, even if single claim dependencies are indicated in the following examples, or in the claims below, all claim dependencies, including multiple claim dependencies, are included within the scope of the present disclosure.

Clause 1: A method, comprising: receiving, by an address resolution and routing agent (ARRA) that comprises a processor, a neighbor solicitation (NS) message via a virtual link, wherein the NS message is received from a first node and is configured to: provide an indication of a request to communicate with a second node, and request one or more communication parameters corresponding to the second node; storing the indication of the request in a report list of the ARRA; and transmitting, via the virtual link, a neighbor advertisement (NA) message to the first node in response to the NS message, wherein the NA message comprises the one or more communication parameters corresponding to the second node.

Clause 2: The method of clause 1, wherein the stored indication of the request is configured to expire after a defined period of time.

Clause 3: The method of clause 1 or 2, wherein the communication parameters corresponding to the second node comprise a network-layer address of the second node and a plurality of physical link-layer addresses of the second node.

Clause 4: The method of clause 3, further comprising receiving, from the second node, signaling configured to indicate a change in one or more of the network-layer address corresponding to the second node, or the plurality of physical link-layer addresses corresponding to the second node.

Clause 5: The method of clause 4, wherein the NA message is a first NA message and the method further comprises: determining whether the report list comprises the stored indication of the request to communicate with the second node; and in response to determining that the report list comprises the stored indication, transmitting, via the virtual link, a second NA message to the first node, wherein the second NA message comprises the indication of the change.

Clause 6: The method of any one of clauses 1-5, wherein the virtual link corresponds to a non-broadcast multiple access (NBMA) link.

Clause 7: The method of any one or clauses 1-6, wherein the ARRA comprises a neighbor cache comprising respective communication parameters for a plurality of nodes on the virtual link.

Clause 8: A method, comprising: in response to determining that a signal is to be transmitted from a first node to a second node, transmitting, by the first node comprising a processor, a first neighbor solicitation (NS) message to an address resolution and routing agent (ARRA), wherein the NS message is configured to indicate the determination to communicate with the second node; receiving, from the ARRA, a neighbor advertisement (NA) message in response to the NS message, wherein the NA message comprises one or more communication parameters corresponding to the second node; and transmitting the signal to the second node using at least one of the one or more communication parameters.

Clause 9: The method of clause 8, wherein transmitting the signal to the second node comprises transmitting the signal over a virtual link via a virtual link interface.

Clause 10: The method of any one of clauses 8 or 9, wherein the communication parameters corresponding to the second node comprise a network-layer address of the second node and a plurality of physical link-layer addresses of the second node.

Clause 11: The method of clause 10, wherein the plurality of physical link-layer addresses correspond to one or more of a plurality of wireless communication links or a plurality of wired communication links.

Clause 12: The method of clause 8, wherein the NA message is a first NA message and the method further comprises receiving, from the ARRA, a second NA message configured to indicate a change in the one or more communication parameters corresponding to the second node.

Clause 13: The method of clause 8, further comprising determining a failure of a first communication parameter of the one or more communication parameters; transmitting, to the ARRA, a second NS message to trigger a second NA message response; and receiving, from the ARRA, a second NA message, wherein the second NA message comprises an indication of a change in the one or more communication parameters corresponding to the second node.

Clause 14: An apparatus, comprising: a processor; and a memory that stores executable instructions that, when executed by the processor, facilitate performance of operations, comprising: receiving, from a first node, a neighbor solicitation (NS) message via a virtual link, wherein the NS message is configured to: provide an indication of a request to communicate with a second node, and request one or more communication parameters corresponding to the second node; storing the indication of the request in a report list; and transmitting, via the virtual link, a neighbor advertisement (NA) message to the first node in response to the NS message, wherein the NA message comprises the one or more communication parameters corresponding to the second node.

Clause 15: The apparatus of clause 14, wherein the NA message is a first NA message and the operations further comprise transmitting, via the virtual link, a second NA message configured to indicate a change in the one or more communication parameters corresponding to the second node.

Clause 16: The apparatus of clause 14, wherein the operations further comprise: detecting a change of a first communication parameter of the one or more communication parameters corresponding to the second node; if in response to determining that the report list comprises the stored indication, transmitting, via the virtual link, a second NA message to the first node, wherein the second NA message comprises the indication of the detected change; and in response to determining that the report list does not comprise the stored indication, transmitting, via the virtual link, the second NA message to the first node upon receipt of a second NS message from the first node.

Clause 17: The apparatus of clause 14, wherein the one or more communication parameters comprise a physical link-layer address corresponding to a non-broadcast multiple access (NBMA) virtual link.

Clause 18: The apparatus of any one or clauses 14-17, wherein the apparatus comprises an address resolution and routing agent (ARRA).

Clause 19: The apparatus of clause 14, wherein the stored indication of the request is configured to expire after a specified period of time.

Clause 20: The apparatus of clause 14, wherein the communication parameters corresponding to the second node comprise a network-layer address of the second node and a plurality of physical link-layer addresses of the second node.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein can be applied to other embodiments. For example, changes can be made in the function and arrangement of elements discussed without departing from the scope of the disclosure. Various examples can omit, substitute, or add various procedures or components as appropriate. For instance, the methods described can be performed in an order different from that described, and various steps can be added, omitted, or combined. Also, features described with respect to some examples can be combined in some other examples. For example, an apparatus can be implemented or a method can be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein can be embodied by one or more elements of a claim.

As used herein, the word "exemplary" means "serving as an example, instance, or illustration." Any aspect described herein as "exemplary" is not necessarily to be construed as preferred or advantageous over other aspects.

To the extent that terms "includes," "including," "has," "contains," and variants thereof are used herein, such terms are intended to be inclusive in a manner similar to the term "comprises" as an open transition word without precluding any additional or other elements.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the terms "determine" and variants thereof (e.g., "determining" or "determined") encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The methods disclosed herein comprise one or more steps or actions for achieving the methods. The method steps and/or actions can be interchanged with one another without departing from the scope of the claims. In other words, unless a specific order of steps or actions is specified, the order and/or use of specific steps and/or actions can be modified without departing from the scope of the claims. Further, the various operations of methods described above can be performed by any suitable means capable of performing the corresponding functions. The means can include various hardware and/or software component(s) and/or module(s), including, but not limited to a circuit, an application specific integrated circuit (ASIC), or processor. Generally, where there are operations illustrated in figures, those operations can have corresponding counterpart means-plus-function components with similar numbering.

The various illustrative logical blocks, modules and circuits described in connection with the present disclosure can be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor can be a microprocessor, but in the alternative, the processor can be any commercially available processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

A processing system can be implemented with a bus architecture. The bus can include any number of interconnecting buses and bridges depending on the specific application of the processing system and the overall design constraints. The bus can link together various circuits including a processor, machine-readable media, and input/output devices, among others. A user interface (e.g., keypad, display, mouse, joystick, etc.) can also be connected to the bus. The bus can also link various other circuits such as timing sources, peripherals, voltage regulators, power management circuits, and other circuit elements that are well known in the art, and therefore, will not be described any further. The processor can be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions can be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor can be responsible for managing the bus and general processing, including the execution of software modules stored on the computer-readable storage media. A computer-readable storage medium can be coupled to a processor such that the processor can read information from, and write information to, the storage medium. In the alternative, the storage medium can be integral to the processor. By way of example, the computer-readable media can include a transmission line, a carrier wave modulated by data, and/or a computer readable storage medium with instructions stored thereon separate from the wireless node, all of which can be accessed by the processor through the bus interface. Alternatively, or in addition, the computer-readable media, or any portion thereof, can be integrated into the processor, such as the case can be with cache and/or general register files. Examples of machine-readable storage media can include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media can be embodied in a computer-program product.

A software module can comprise a single instruction, or many instructions, and can be distributed over several different code segments, among different programs, and across multiple storage media. The computer-readable media can comprise a number of software modules. The software modules include instructions that, when executed by an apparatus such as a processor, cause the processing system to perform various functions. The software modules can include a transmission module and a receiving module. Each software module can reside in a single storage device or be distributed across multiple storage devices. By way of example, a software module can be loaded into RAM from a hard drive when a triggering event occurs. During execution of the software module, the processor can load some of the instructions into cache to increase access speed. One or more cache lines can then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. Unless specifically stated otherwise, the terms "first" and "second" are not used to indicate a directional communication aspect of a node or to indicate a numerical limit of a number of nodes in a group of nodes, but rather are used to distinguish or identify the individual nodes of a group of nodes. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving, by an address resolution and routing agent (ARRA) that comprises a processor, a neighbor solicitation (NS) message via a virtual link, wherein the virtual link is configured to provide a common link between multiple physical link-layer communication systems, and wherein the NS message is received from a first node and is configured to:
      provide an indication of a request to communicate with a second node, and
      request one or more communication parameters corresponding to the second node;
   storing the indication of the request in a report list of the ARRA; and
   transmitting, via the virtual link, a neighbor advertisement (NA) message to the first node in response to the NS message, wherein the NA message comprises the one or more communication parameters corresponding to the second node.

2. The method of claim 1, wherein the stored indication of the request is configured to expire after a defined period of time.

3. The method of claim 1, wherein the communication parameters corresponding to the second node comprise a network-layer address of the second node and a plurality of physical link-layer addresses of the second node.

4. The method of claim 3, further comprising receiving, from the second node, signaling configured to indicate a change in one or more of the network-layer address corresponding to the second node, or the plurality of physical link-layer addresses corresponding to the second node.

5. The method of claim 4, wherein the NA message is a first NA message and the method further comprises:
   determining whether the report list comprises the stored indication of the request to communicate with the second node; and
   in response to determining that the report list comprises the stored indication, transmitting, via the virtual link, a second NA message to the first node, wherein the second NA message comprises the indication of the change.

6. The method of claim 1, wherein the virtual link corresponds to a non-broadcast multiple access (NBMA) link.

7. The method of claim 1, wherein the ARRA comprises a neighbor cache comprising respective communication parameters for a plurality of nodes on the virtual link.

8. A method, comprising:
   in response to determining that a signal is to be transmitted from a first node to a second node, transmitting, by the first node comprising a processor, a first neighbor solicitation (NS) message to an address resolution and routing agent (ARRA), wherein the NS message is configured to indicate the determination to communicate with the second node;
   receiving, from the ARRA, a neighbor advertisement (NA) message in response to the NS message, wherein the NA message comprises one or more communication parameters corresponding to the second node; and
   transmitting, via a virtual link, the signal to the second node using at least one of the one or more communication parameters, wherein the virtual link is configured to provide a common link between multiple physical link-layer communication systems.

9. The method of claim 8, wherein transmitting the signal via the virtual link further comprises transmitting the signal over the virtual link via a virtual link interface comprising one or more of a virtual network interface card (vNIC) or a virtual host bus adapter (vHBA).

10. The method of claim 8, wherein the communication parameters corresponding to the second node comprise a network-layer address of the second node and a plurality of physical link-layer addresses of the second node.

11. The method of claim 10, wherein the plurality of physical link-layer addresses correspond to one or more of a plurality of wireless communication links or a plurality of wired communication links.

12. The method of claim 8, wherein the NA message is a first NA message and the method further comprises receiving, from the ARRA, a second NA message configured to indicate a change in the one or more communication parameters corresponding to the second node.

13. The method of claim 8, further comprising:
   determining a failure of a first communication parameter of the one or more communication parameters;
   transmitting, to the ARRA, a second NS message to trigger a second NA message response; and
   receiving, from the ARRA, a second NA message, wherein the second NA message comprises an indication of a change in the one or more communication parameters corresponding to the second node.

14. An apparatus, comprising:
   a processor; and
   a memory that stores executable instructions that, when executed by the processor, facilitate performance of operations, comprising:
      receiving, from a first node, a neighbor solicitation (NS) message via a virtual link, wherein the virtual link is configured to provide a common link between multiple physical link-layer communication systems, and wherein the NS message is configured to:
         provide an indication of a request to communicate with a second node, and
         request one or more communication parameters corresponding to the second node;
      storing the indication of the request in a report list; and
      transmitting, via the virtual link, a neighbor advertisement (NA) message to the first node in response to the NS message, wherein the NA message comprises the one or more communication parameters corresponding to the second node.

15. The apparatus of claim 14, wherein the NA message is a first NA message and the operations further comprise transmitting, via the virtual link, a second NA message configured to indicate a change in the one or more communication parameters corresponding to the second node.

16. The apparatus of claim 14, wherein the operations further comprise:
   detecting a change of a first communication parameter of the one or more communication parameters corresponding to the second node;
   in response to determining that the report list comprises the stored indication, transmitting, via the virtual link, a second NA message to the first node, wherein the second NA message comprises the indication of the detected change; and
   in response to determining that the report list does not comprise the stored indication, transmitting, via the virtual link, the second NA message to the first node upon receipt of a second NS message from the first node.

17. The apparatus of claim 14, wherein the one or more communication parameters comprise a physical link-layer address corresponding to a non-broadcast multiple access (NBMA) virtual link.

18. The apparatus of claim 14, wherein the apparatus comprises an address resolution and routing agent (ARRA).

19. The apparatus of claim 14, wherein the stored indication of the request is configured to expire after a specified period of time.

20. The apparatus of claim 14, wherein the communication parameters corresponding to the second node comprise a network-layer address of the second node and a plurality of physical link-layer addresses of the second node.

* * * * *